United States Patent
Nakabayashi (10) Patent No.: US 6,736,999 B2
(45) Date of Patent: May 18, 2004

(54) METHOD OF MANUFACTURING OPTICAL ELEMENT AND OPTICAL ELEMENT MANUFACTURED THEREBY

(75) Inventor: Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 09/928,337

(22) Filed: Aug. 14, 2001

(65) Prior Publication Data

US 2002/0027303 A1 Mar. 7, 2002

(30) Foreign Application Priority Data

Aug. 22, 2000 (JP) .......................... 2000-251274

(51) Int. Cl.⁷ ............................... B29D 11/00
(52) U.S. Cl. ....................... 264/1.1; 264/1.32
(58) Field of Search ................ 264/1.7, 1.9, 334, 264/1.1, 1.32; 425/808

(56) References Cited

FOREIGN PATENT DOCUMENTS

| JP | 64-7001 | * | 1/1989 |
| JP | 1-152015 | * | 6/1989 |
| JP | 3-79314 | | 4/1991 |

OTHER PUBLICATIONS

Michael W. Farn et al., "Diffractive Doublet Corrected On–Axis at Two Wavelengths," 1354 *SPIE* 24–29(1990).

Carmiña Londoño et al., "The design of Achromated Hybrid Diffractive Lens Systems," 1354 *SPIE* 30–37 (1990).

* cited by examiner

*Primary Examiner*—Mathieu D. Vargot
(74) *Attorney, Agent, or Firm*—Fitzpatrick, Cella, Harper & Scinto

(57) ABSTRACT

A method of manufacturing an optical element is disclosed which comprises the steps of providing a molding material onto a mold; giving a local temperature difference to an interface between the mold and the molding material to separate the mold and the molding material from each other in an area; and successively enlarging the area of separation made by the temperature difference to entirely separate the mold and the molding material from each other.

1 Claim, 8 Drawing Sheets

METHOD OF MANUFACTURING OPTICAL ELEMENT AND OPTICAL ELEMENT MANUFACTURED THEREBY

BACKGROUND OF THE INVENTION

1. Field of the Invention

The present invention relates to a method of manufacturing an optical element using a mold and to an optical element manufactured thereby. The present invention is particularly suitable for manufacturing, for example, a diffraction optical element of a stack structure with a grating structure for allowing the light beams in the region of the wavelength used to concentrate on a specific order.

2. Related Background Art

Hitherto, the chromatic aberration of an optical system has been corrected by combining optical elements made of glass materials different in dispersion. Further, the articles published in SPIE Vol. 1354 on pages 24–37 disclose a method of correcting chromatic aberration using a diffraction optical system.

When adding a diffraction plane having a diffraction effect to an optical system having spectral characteristics, it is important to keep high the diffraction efficiency in the region of the wavelength used. However, with the diffraction optical system, as to a light of an order other than the design order, the more the order becomes different from the design order, the larger the diffraction angle will be and the larger the difference in focal length will be. This will result in defocus, and especially when there exists a light source with a high luminance, side lobe may sometimes occur.

On the other hand, by constructing a diffraction optical element of a stack structure having two or more layers, considerable improvement in quality of images and information may be expected and improvement in optical performance is made possible. The stacked diffraction optical element having two or more layers can be formed by superposing and joining a plurality of optical members each having a diffraction grating. Further, the method of manufacturing such optical members includes, for example, a method of filling a molding material into a mold having a pattern corresponding to a diffraction grating formed therein, transferring the pattern to the molding material, and then separating the molding material from the mold.

On the other hand, as the method of forming a pattern on a surface of a mold, there has been known a method using a typical fine-processing technique, such as photolithography of a semiconductor manufacturing process or a precision cutting technique with a diamond tool. By molding plastic or glass with a mold having a pattern formed by such processing techniques, the optical members described above can be manufactured.

However, the stacked diffraction optical element allows improvement in optical performance as described above, but still has problems such that its manufacturing method is very complicated, its costs are high, and it is difficult to put into practical use, as long as the conventional methods are used as such, though the details will be described below.

In the stacked diffraction optical element described above, the optical members for stacking themselves must be produced with a high accuracy. As a technique for producing replicas of optical members, a replica molding method using a photo-setting resin has hitherto been preferably used on account of its high transferring property, profile irregularity and convenience. This method makes it possible to transfer a highly fine pattern from a mold having the highly fine pattern formed therein by photolithography technique, to a molding material, and therefore, is an important technique still. As for the transferring property, though they are affected by the amount of cure shrinkage of the material itself, there have been proposed various techniques.

For example, in Japanese Patent Application Laid-Open No. 3-79314, there is proposed a mold release technique for use in the molding method. This technique, however, gives rise to a problem, as described below, when the depth of the unevenness of a fine pattern is large. A stacked diffraction optical element is literally formed by joining two or more optical members each having a diffraction grating. Therefore, considering the weight reduction and miniaturization of the products in which the stacked diffraction optical element is used, each optical member is required to be thin. However, in the conventional replica molding method described above, mold release is performed in such a manner as to pull up a glass substrate of a diameter larger than that of the mold; therefore, during the progress of mold release, a very large amount of warp (deformation) in the entire element will be generated.

In the molding of a graded index lens having a spherical or a spherical surface, for example, the shape of the molded form is not affected very much by mold release; however, in the molding of a diffraction optical element with unevenness of a fine pitch on its surface, the release angle due to warps and deformations produces a force which may knock the fine molded form down, whereby the molded form is deformed or damaged. Since the magnitude of the deformation or the damage mainly depends on the adhesion between the molding material and the mold material, in order to lower the adhesion, a method can be adopted in which a release agent is applied onto the mold; however, considering the occurrence of the disorder of the fine molded form and difficulties of the maintenance during mass production, the method still has problems.

Figure 1:
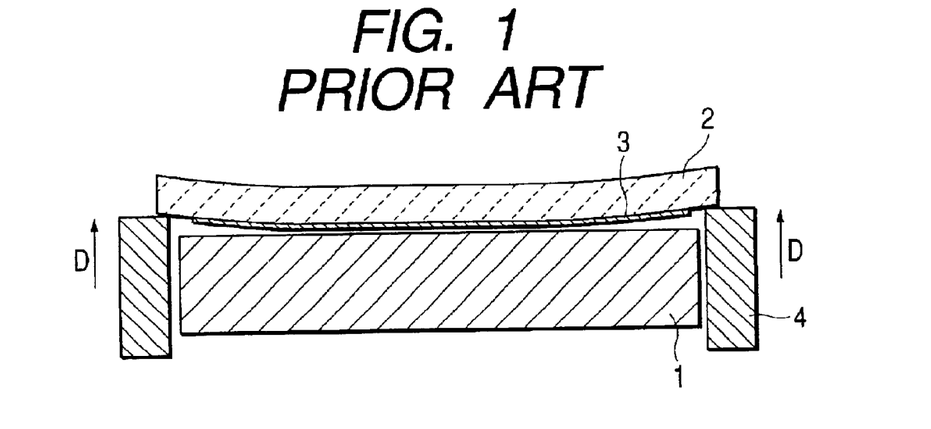
FIG. 1 is a schematic sectional view illustrating the prior art method of manufacturing an optical element.

In the following, the above problems will be described in detail. Referring to FIG. 1, there is shown a schematic sectional view illustrating the prior art method of manufacturing an optical element. In the same figure, reference numeral 1 denotes a mold. In the surface of the mold 1, there is formed a fine pattern corresponding to a diffraction grating which is to be formed finally.

When manufacturing an optical element, first photo-setting resin is dropped onto the mold 1 and then a glass substrate 2 is put thereon so as to spread the resin entirely on the mold to give a desired thickness. Then, the photo-setting resin is irradiated with ultraviolet light via the glass substrate 2 to be set so as to form a resin layer 3. On the bottom surface of the resin layer 3, the pattern of the diffraction grating formed in the mold is transferred. Lastly, ejector pins 4 provided just around the mold 1 are moved in the direction shown by arrows D so as to push up the peripheral portion of the glass substrate 2, whereby the resin layer 3 together with the glass substrate 2 is separated from the mold 1.

Figure 2:
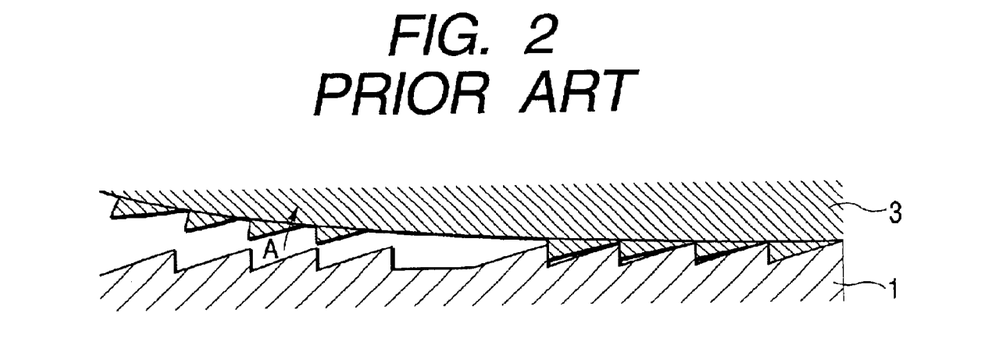
FIG. 2 is a schematic sectional view illustrating a state in which an optical member with a concave diffraction grating is separated from a mold.

As described above, when separating an optical member from a mold by applying a force thereto, the pattern as transferred to the optical member may be deformed or damaged. This tendency is remarkable when forming an optical member with a diffraction grating having a concave lens effect. Referring to FIG. 2, there is shown a schematic sectional view illustrating a state in which an optical member with such a diffraction grating having a concave lens effect (i.e., concave diffraction grating) is separated from a mold 1. For an optical member with a diffraction grating having a convex lens effect (i.e., convex diffraction grating), in other words, with a concave-type mold necessary for molding thereof, when allowing the release of the optical member to proceed from the outer side of the mold to the center of the mold, the separation of the optical member from the mold progresses while keeping the molded resin grating from colliding against the grating shape of the mold. However, for an optical member with a concave diffraction grating, in other words, with a convex-type mold, when allowing the release of the optical member to proceed from the outer side of the mold to the center of the mold, just like the above case, the grating of the resin layer 3 molded as shown in FIG. 2 will collide against the grating shape of the mold, whereby the grating shape of the molded piece is significantly deformed or damaged. In FIG. 2, an arrow A denotes the direction in which the separation proceeds. It is known that such a diffraction grating causes a lowering in diffraction efficiency and a flare to occur, thus significantly affecting the image quality.

SUMMARY OF THE INVENTION

It is, therefore, an object of the present invention to solve the problems of the prior art described above and provide a method of manufacturing an optical element which allows a stable mass production without causing deformations and damages during the mold release.

According to a first aspect of the present invention, there is provided a method of manufacturing an optical element, comprising the steps of:

providing a molding material onto a mold;

giving a local temperature difference to an interface between the mold and the molding material to separate the mold and the molding material from each other in an area; and successively enlarging the area of separation made by the temperature difference to entirely separate the mold and the molding material from each other.

According to a second aspect of the present invention, there is provided a method of manufacturing an optical element having in a surface thereof a fine pattern with a concave lens effect, comprising the steps of:

providing a molding material onto a mold having in a surface thereof a configuration corresponding to the fine pattern;

putting a substrate on the molding material;

giving a local temperature difference to an interface between the mold and the molding material at a peripheral portion of an optical element to be manufactured, to separate the mold and the molding material from each other in an area;

enlarging the area of separation made by the temperature difference successively from the peripheral portion to a center portion of the optical element such that the substrate warps convexly relative to the mold and only the center portion remains unseparated with the peripheral portion being separated;

bringing an ejector pin projecting from the mold side into contact with a peripheral portion of the substrate; and heating an interface between the mold and the molding material at the center portion of the optical element to entirely separate the mold and the molding material from each other.

According to a third aspect of the present invention, there is provided an optical element manufactured by the method as set forth above.

According to a fourth aspect of the present invention, there is provided an optical system comprising a plurality of optical elements including the optical element as set forth above.

According to a fifth aspect of the present invention, there is provided an optical device for forming an image using the optical system as set forth above.

PREFERRED EMBODIMENTS OF THE INVENTION

In the embodiments of the present invention described below, it is possible to mass-produce optical elements, in particular, stacked diffraction optical elements having a grating structure which allows the light beams in the region of the wavelength used to concentrate on a specific order without destroying the shape of each diffraction grating which greatly affects the quality of the optical elements manufactured.

Embodiment 1

Figure 3A:
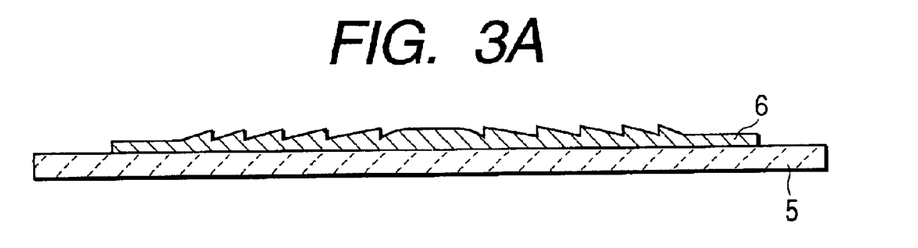
FIGS. 3A and 3B are schematic sectional views showing optical members manufactured by the method according to a first embodiment of the present invention.
Figure 3B:
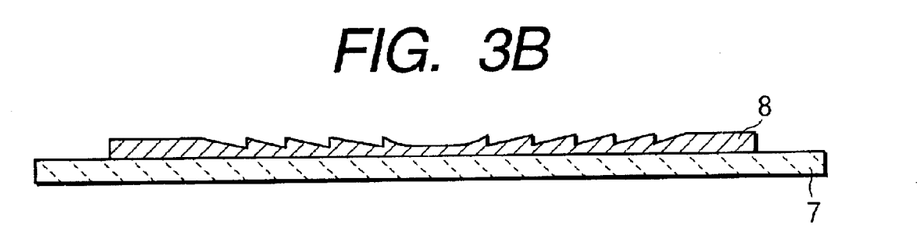

Referring now to FIGS. 3A and 3B, there are shown schematic sectional views of optical members manufactured by the method according to the first embodiment of the present invention. FIG. 3A shows an optical member having a diffraction grating which has a concave lens effect (concave type diffraction grating). This optical member comprises a glass substrate 5 and a resin layer 6 formed thereon. In the surface of the resin layer 6, a blazed grating pattern with a concave lens effect is formed. FIG. 3B shows an optical member having a diffraction grating which has a convex lens effect (convex type diffraction grating). This optical member comprises a glass substrate 7 and a resin layer 8 formed thereon. In the surface of the resin layer 8, a blazed grating pattern having a convex lens effect is formed.

Figure 4:
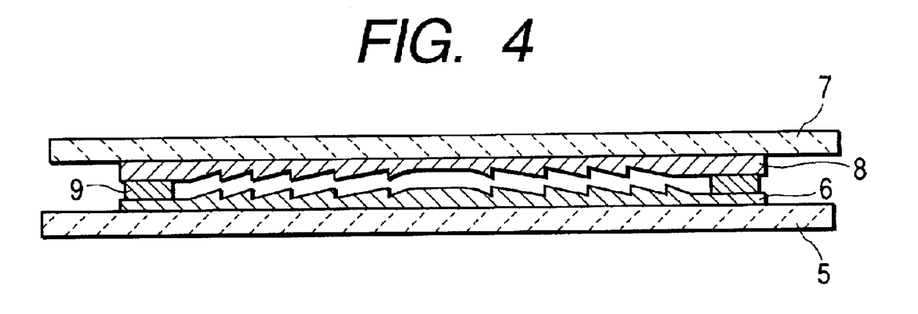
FIG. 4 is a schematic sectional view showing a stacked diffraction optical element formed using the optical member shown in FIGS. 3A and 3B.

A stacked diffraction optical element is formed by bonding the two optical members shown in FIGS. 3A and 3B to each other. Referring to FIG. 4, there is shown a schematic sectional view of such a stacked diffraction optical element. In the same figure, the same members as those of FIGS. 3A and 3B are marked with the same reference numerals and the detailed description thereof will be omitted. The stacked diffraction optical element of FIG. 4 is formed by adhering the optical member comprising the glass substrate 7 and the resin layer 8 to the optical member comprising the glass substrate 5 and the resin layer 6 with an adhesive layer 9 with the surfaces of the both optical members having the diffraction grating formed thereon facing each other.

Then, the method of the present embodiment for manufacturing the above mentioned optical member will be described with reference to FIGS. 5, 6, and 7A to 7D.

Figure 5:
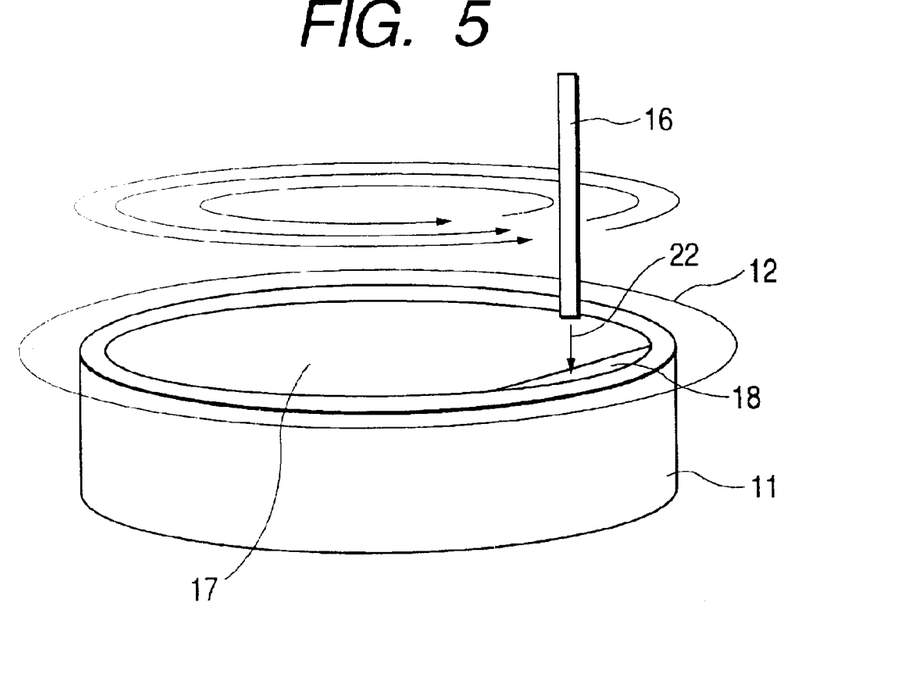
FIG. 5 and FIG. 6 are schematic perspective views illustrating the first embodiment of the manufacturing method of the present invention.

First, as shown in the schematic perspective view of FIG. 5, a photo-setting resin (not shown in the figures) is dropped on a mold 11 having a fine grating pattern formed on an upper surface thereof, and a glass substrate 12 is put thereon so as to spread the resin entirely on the mold to give a desired thickness. Then, the photo-setting resin is irradiated with ultraviolet light via the glass substrate 12 to be set so as to form a resin layer (not shown in the figure). On the lower surface of the resin layer, the pattern of the diffraction grating formed on the mold is transferred.

Then, cold air 22 is blown from a cooling air pipe 16 to the glass substrate 12 at a portion a little away from the edge toward the center while preventing lowering of the temperature of the whole substrate, thus giving a local temperature difference between the mold 11 and the resin layer. This allows the mold and the resin layer to separate from each other in an area. In FIG. 5, the area denoted by reference numeral 17 is an unseparated portion 17 and the area denoted by reference numeral 18 is a separated portion.

Figure 6:
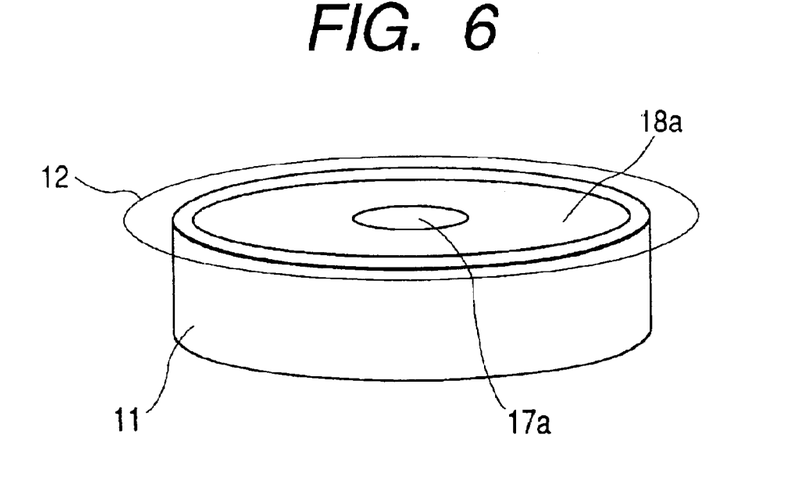

Then, the cooling air pipe 16 is moved in a circle along the circumference of the substrate so as to separate the mold and the resin layer at the entire circle portion. The movement of the cooling air pipe in a circle is continued while decreasing the radius of the circle gradually to enlarge the area of separation (separated area) to the vicinity of the center of the optical members. This process results in a state in which an unseparated portion 17a is left only at the center and its vicinity of the optical member and the peripheral portion is a separated portion 18a, as shown in the schematic perspective view of FIG. 6. In FIG. 6, the same members as those of FIG. 5 are marked with the same reference numerals and the detailed description thereof will be omitted. In the present embodiment, although the cooling air pipe 16 is moved in a circle, the mold 11 and the glass substrate 12 may be moved relative to the cooling air pipe by rotating them, as an integrated unit, around the center of the optical member, so as to enlarge the separated area.

Referring now to FIGS. 7A to 7D, there are shown schematic sectional views illustrating the process, which is subsequent to the above described process, of completely separating the optical member from the mold. In FIGS. 7A to 7D, the same members as those of FIGS. 5 and 6 are marked with the same reference numerals and the detailed description thereof will be omitted.

Figure 7A:
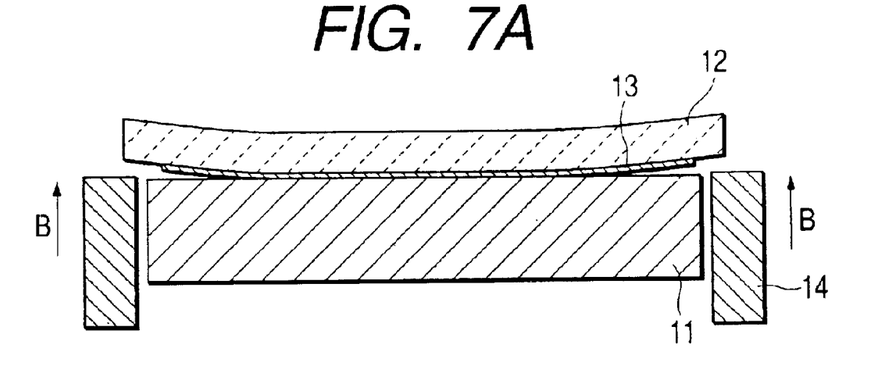
FIGS. 7A, 7B, 7C and 7D are schematic sectional views illustrating the first embodiment of the manufacturing method of the present invention.
Figure 7B:
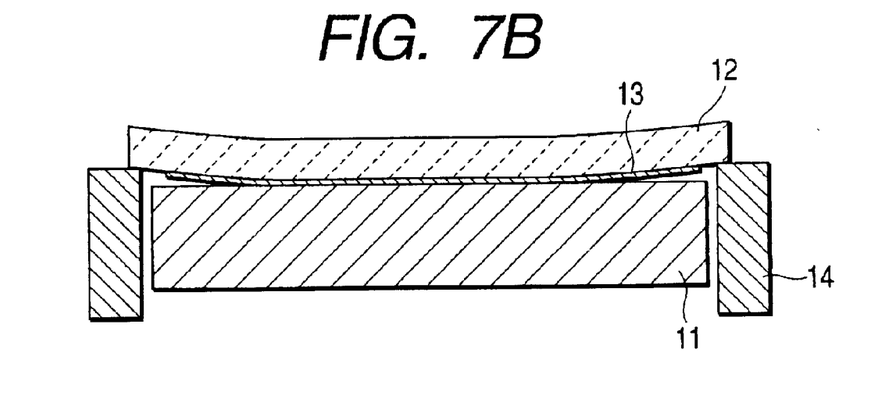

FIG. 7A is a sectional view showing the state of the optical member shown in FIG. 6. The resin layer 13 on the glass substrate 12 is not separated from the mold at the center and in the vicinity thereof. The glass substrate 12 warps convexly relative to the mold and the peripheral portion of the resin layer 13 is already separated from the mold 11. In such a situation, ejector pins 14 provided just around the mold 11 are moved in the direction shown by an arrow B until they come into contact with the peripheral portion of the glass substrate 12. Thus, the optical member is brought into the state shown in FIG. 7B. The ejector pins 14 are designed to stop when coming into contact with the glass substrate 12 so as not to produce such a force as to push up the glass substrate 12.

Figure 7C:
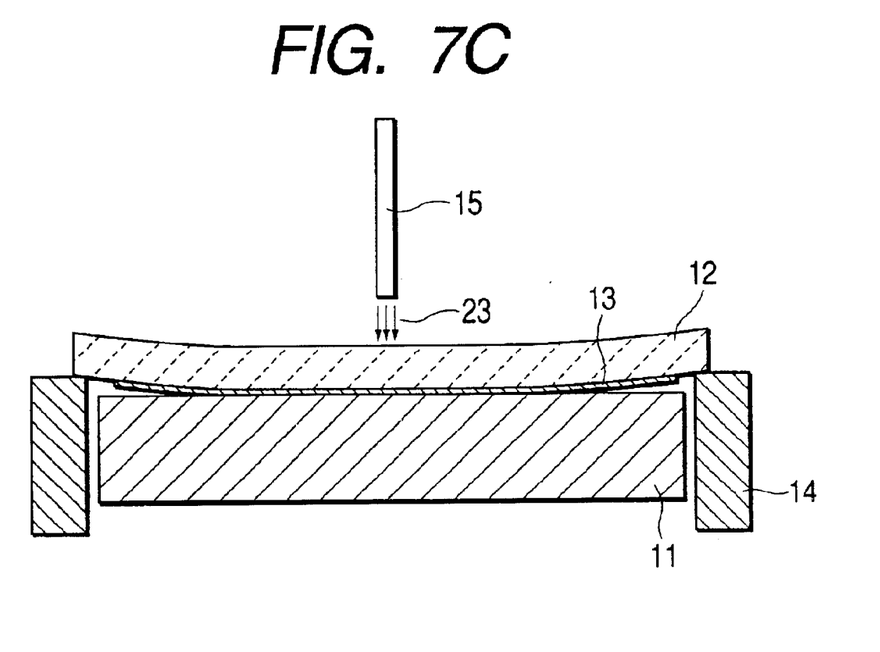
Figure 7D:
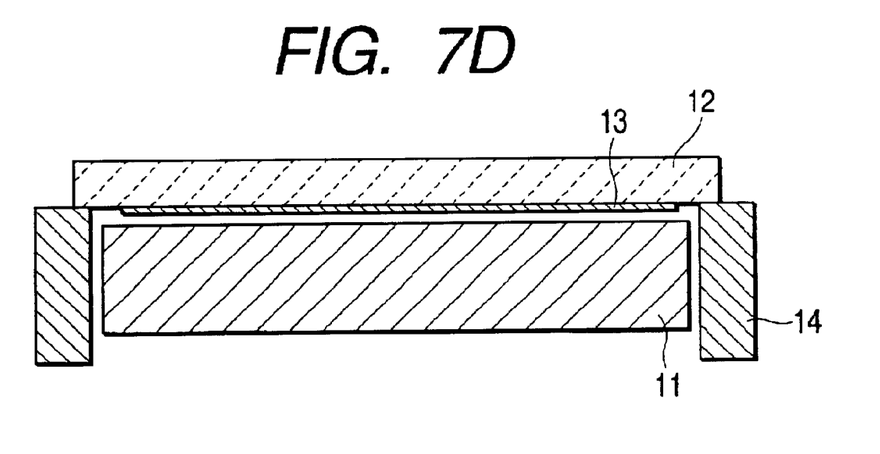

Then, warm air 23 is blown from a heating air pipe 15 to the center and its vicinity of the optical member, as shown in FIG. 7C, so that the resin layer 13 is completely separated from the mold 11, as shown in FIG. 7D.

The method described so far is particularly suitable for manufacturing an optical member with a concave diffraction grating such as shown in FIG. 3A, but it is satisfactorily applied to the manufacture of an optical member with a convex diffraction grating such as shown in FIG. 3B. As described above, in the present embodiment, since the molded optical member is not mechanically peeled off from the mold but is separated from the mold by giving a local temperature difference thereto, optical parts can be manufactured without largely deforming or damaging the shape of grating.

Embodiment 2

Figure 8:
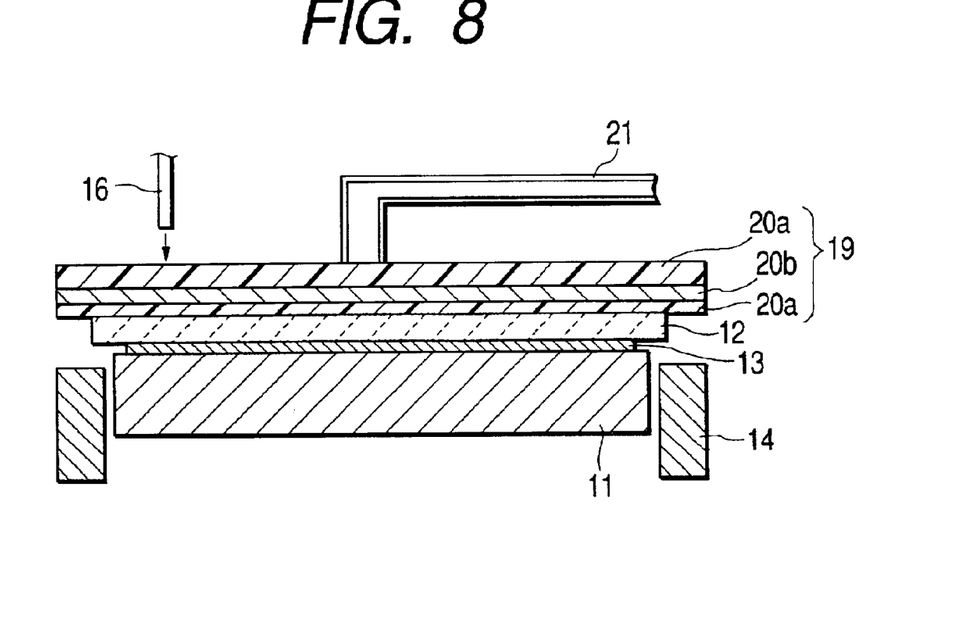
FIG. 8 is a schematic sectional view showing a manufacturing apparatus used in a second embodiment of the manufacturing method of the present invention.

Referring to FIG. 8, there is shown a schematic sectional view of a manufacturing apparatus used in a second embodiment of the manufacturing method of the present invention. In FIG. 8, the same members as those of FIGS. 5, and 7A to 7D are marked with the same reference numerals and the detailed description thereof will be omitted. Although in aforementioned Embodiment 1, mold release is carried out by directly adjusting the temperature of the glass substrate 12, the present embodiment is characterized in that an intervening member 19 comprised of a material with a thermal expansion coefficient higher than that of glass, such as plastic, etc. is brought into close contact with the glass substrate 12 and a local temperature difference is given via the intervening member 19. The other processes are the same as those of Embodiment 1. When giving a temperature difference via a material having a high thermal expansion coefficient as mentioned above, the molded piece can easily be separated from the mold even with a small temperature difference. However, if the amount of deformation due to a temperature change is too large, the element itself is deformed greatly, thus damaging its fine configuration. Therefore, thermal deformation analysis needs to be carried out beforehand. Further, since the amount of warp depends on the temperature difference between the front and the back sides of the material, it is preferable for the intervening member to select a material of a low thermal conductivity. In the present embodiment, the intervening member 19 has a thermal insulation structure in which a thermal insulation layer 20b is formed between two plate-like plastic members 20a. In FIG. 8, reference numeral 21 denotes a piping as connected to a suction pump (not shown), which is used for, for example, conveying the molded optical member.

Embodiment 3

Figure 9:
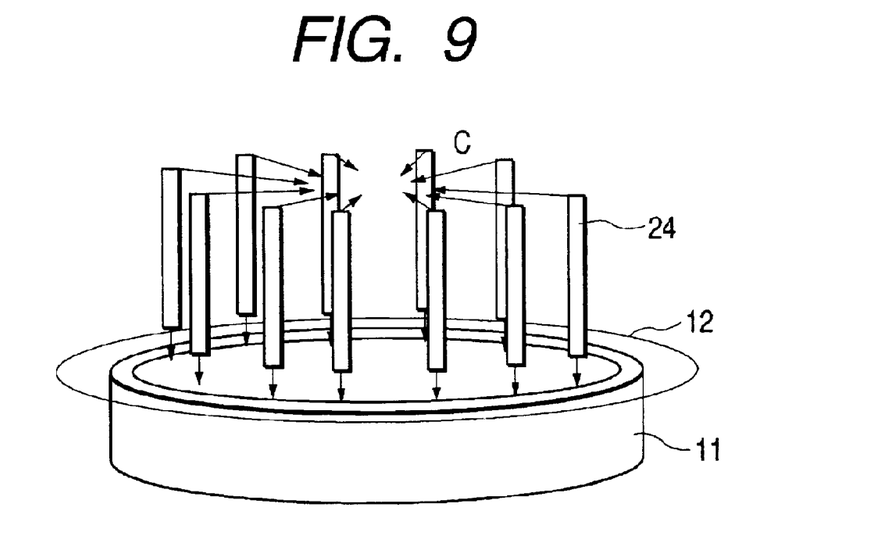
FIG. 9 is a schematic perspective view illustrating a third embodiment of the manufacturing method of the present invention.

Referring now to FIG. 9, there is shown a schematic perspective view illustrating a third embodiment of the manufacturing method of the present invention. In FIG. 9, the same members as those of FIG. 5 are marked with the same reference numerals and the detailed description thereof will be omitted. In Embodiment 1 as illustrated in FIG. 5 the area in which the molded optical element and the mold are separated is enlarged while rotating a cooling air pipe, while the present embodiment is characterized in that a plurality of cooling air pipes 24 are arranged at the peripheral portion of the molded optical element and the area in which the molded optical element and the mold are separated is enlarged by moving the plurality of air pipes 24 to the center portion of the optical member, as shown by an arrow C in FIG. 9. The other processes are the same as those of Embodiment 1. Using this method makes it possible to carry out the mold release more effectively than the method of Embodiment 1.

Figure 10:
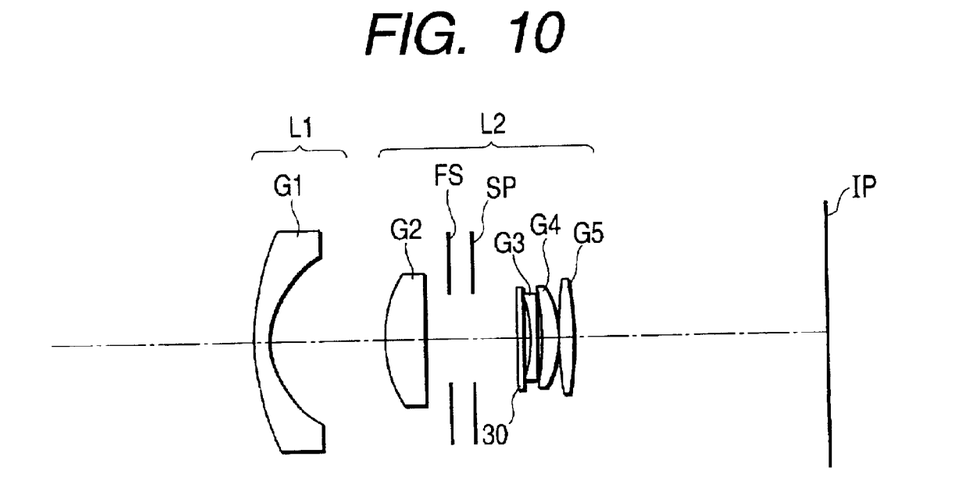
FIG. 10 is a schematic sectional view showing an example of an optical system using a diffraction optical element manufactured by the method of the present invention.

Referring to FIG. 10, there is shown a schematic sectional view of one example of the optical system using a diffraction optical element manufactured by the method of the present invention. In this example, a diffraction optical element is used in a zoom lens for use in a camera.

In the zoom lens as shown in FIG. 10, a first lens group L1 having a negative refracting power and a second lens group L2 having a positive refracting power are arranged in the mentioned order from the side of an object. Reference character FS denotes a flare stop; reference character SP denotes a stop; and reference character IP denotes an image plane. The focusing from an object at an infinite point to an object at a near point is carried out by moving the first lens group L1 and the second lens group L2 integrally to the object side. The first lens group L1 comprises a meniscus-like negative lens G1 with its convex side facing the object, while the second lens group L2 comprises a positive lens G2 both sides of which are convex, a negative lens G3 both sides of which are concave and two positive lenses G4 and G5. In this zoom lens, a diffraction optical element 30 as shown in FIG. 4 is used on the object side of the negative lens G3.

Figure 11:
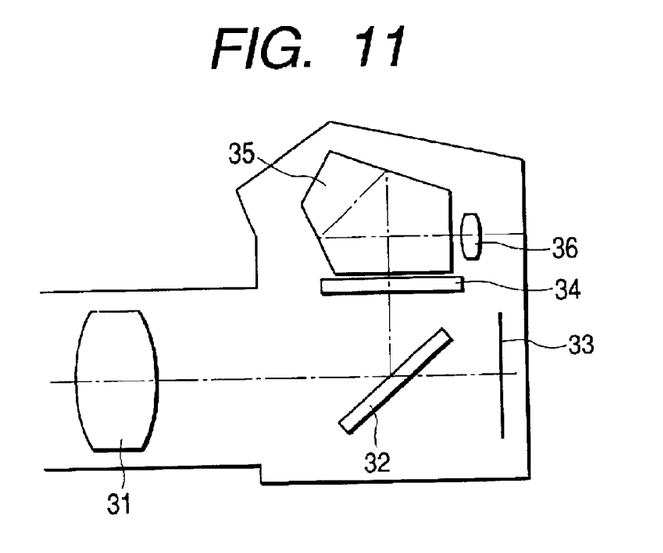
FIG. 11 is a schematic sectional view showing a single-lens reflex camera which is a first example of the optical device using the optical system as shown in FIG. 10.

Referring to FIG. 11, there is shown a schematic sectional view of a first example of the optical device. In this example, an optical system having a diffraction optical element manufactured by the method of the present invention is applied to a single-lens reflex camera which is one of the imaging devices.

In the camera as shown in FIG. 11, a primary mirror 32 and a film plane 33 are arranged at the back of an image pick up lens 31. Further, a focusing plate 34 and a pentagonal prism 35 are arranged in the direction of reflection by the primary mirror 32. In the direction of reflection by the pentagonal prism 35, an eyepiece 36 is arranged. In this camera, the lenses such as shown in FIG. 10 are used as the image pick up lens 31.

Figure 12:
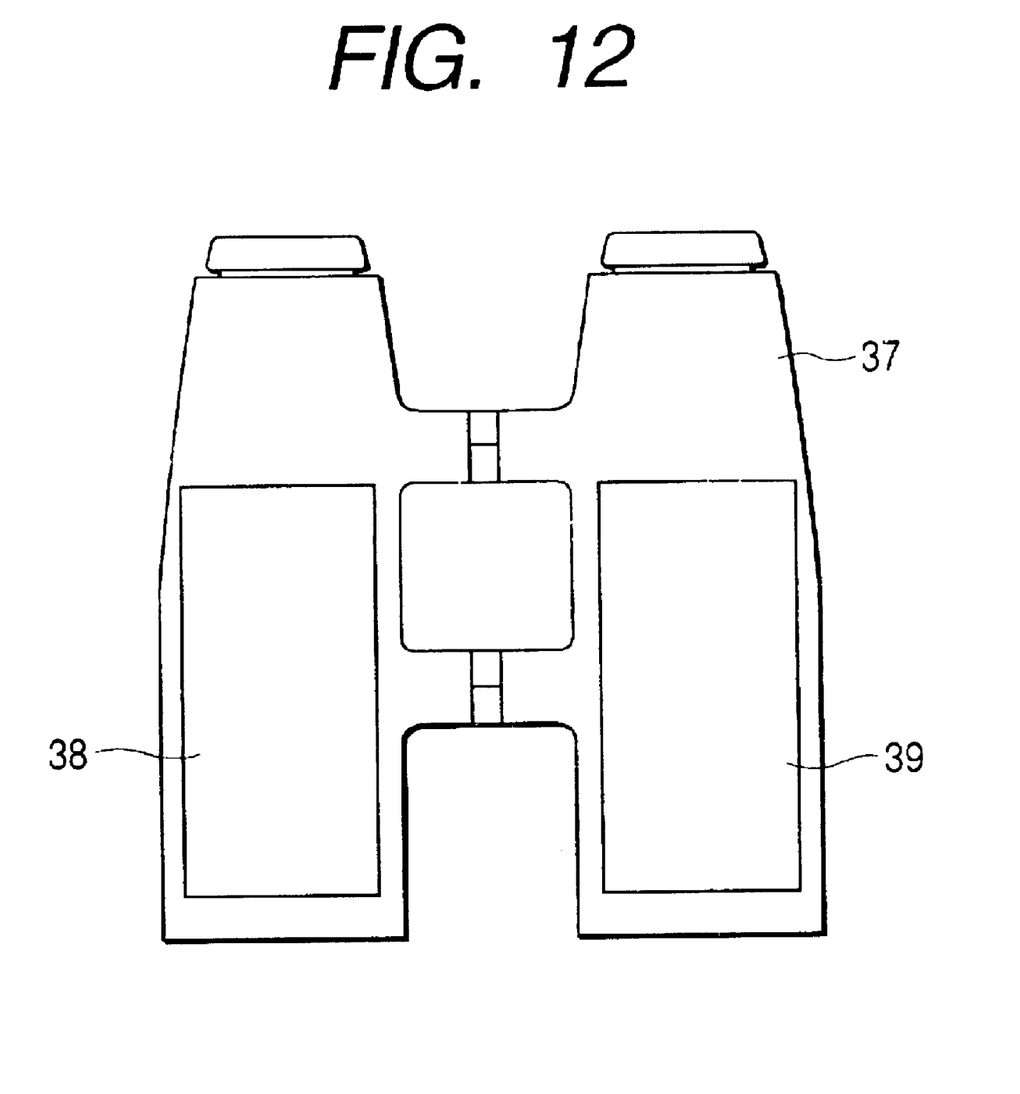
FIG. 12 is a schematic sectional view showing a binocular which is a second example of the optical device using the optical system as shown in FIG. 10.

Referring to FIG. 12, there is shown a schematic sectional view of a second example of the optical device. In this example, an optical system having a diffraction optical element manufactured by the method of the present invention is applied to a binocular which is one of the imaging devices.

In the binocular as shown in FIG. 12, a pair of lenses 38 and 39 are mounted in a body 37. For each of the lenses 38 and 39, for example, the lenses as shown in FIG. 10 may be used. In other words, in the binocular of this example, a diffraction optical element manufactured by the aforementioned method is used for a part of the lenses.

The present invention is applicable not only to the single-lens reflex camera as shown above, but also to other imaging devices, such as video cameras or the like. Further, the present invention is applicable not only to the binocular as shown above, but also to other observing devices, such as microscopes.

As described so far, according to the method of the present invention, optical elements can be manufactured in a stable manner without causing deformations and damages due to mold release. While the present invention has been described in terms of its preferred embodiments, it is to be understood that various changes and modifications can be made in it without departing the spirit and scope thereof.

What is claimed is:

1. A method of manufacturing an optical element having in a surface thereof a fine pattern with a concave lens effect, comprising the steps of:

providing a molding material onto a mold having in a surface thereof a configuration corresponding to the fine pattern;

putting a substrate on the molding material;

giving a local temperature difference to an interface between the mold and the molding material at a peripheral portion of an optical element to be manufactured, to separate the mold and the molding material from each other in an area;

enlarging the area of separation made by the temperature difference successively from the peripheral portion to a center portion of the optical element such that the substrate warps convexly relative to the mold and only the center portion remains unseparated with the peripheral portion being separated;

bringing an ejector pin projecting from the mold side into contact with a peripheral portion of the substrate; and heating an interface between the mold and the molding material at the center portion of the optical element to entirely separate the mold and the molding material from each other.

* * * * *